US005252182A

United States Patent [19]

Hong

[11] Patent Number: 5,252,182

[45] Date of Patent: Oct. 12, 1993

[54] METHOD FOR MANUFACTURING THERMAL RECORDING DEVICE

[75] Inventor: Eun-Tak Hong, Seoul, Rep. of Korea

[73] Assignee: SamSung Electronics Co., Ltd., Suwon, Rep. of Korea

[21] Appl. No.: 724,807

[22] Filed: Jul. 2, 1991

[30] Foreign Application Priority Data

Nov. 20, 1990 [KR] Rep. of Korea ................ 1990-18793

[51] Int. Cl.[5] .............................................. G01D 15/10

[52] U.S. Cl. .................................... 156/655; 156/656; 156/659.1; 29/611; 29/620; 346/76 PH

[58] Field of Search ..................... 156/655, 656, 659.1; 346/76 PH; 29/611, 620

[56] References Cited

U.S. PATENT DOCUMENTS 4,973,986 11/1990 Narita ............................ 346/76 PH

FOREIGN PATENT DOCUMENTS 234264 9/1989 Japan .............................. 346/76 PH

*Primary Examiner*—Thi Dang

*Attorney, Agent, or Firm*—Robert E. Bushnell

[57] ABSTRACT

A method for processing a wiring fraction of on a heat-generating resistance of a thermal recording device, having different thicknesses at different regions are using a masking process or a dual exposing process, so that a height difference between the heat-generating resistance and the wiring is dualized and the contact pressure between a thermal recording paper and the heat-generating resistance is maximized, thereby enabling a high quality printing operation with low power consumption.

18 Claims, 6 Drawing Sheets

METHOD FOR MANUFACTURING THERMAL RECORDING DEVICE

BACKGROUND OF THE INVENTION

The present invention relates to a thermal recording device, and particularly to a method of forming a distributing wire for the thermal recording device.

Generally the thermal recording device is used for recording in formation by thermal recording or a thermal transcribing method. The thermal recording device is comprised of a plurality of heat-generating resistance, formed on a ceramic insulating substrate (on which a glaze is spread), and the heat-generating resistances are electrically connected to a driving integrated circuit in order to enable performance of each of the heat-generating resistance;

Thus if processed digital pulses are applied to the respective bits of the driving integrated circuit, the respective bits perform switching operations independently, so that the respective heat-generating resistances are driven. As a result, the heat generated from the heat-generating resistances are transferred to a heat-sensitive paper to enable a printing operation.

Referring to FIG. 1 which illustrates a partial plain view of a conventional thermal recording device, the conventional thermal recording device comprises a plurality of heat-generating resistances 10, a first wiring 12, first and second bonding pads 16, 17, and a second wiring 22. The wiring 12 formed on a heat-generating resistance film (not shown in the drawing) is extended in the vertical direction, i.e., in a first direction adjacently to the heat-generating resistances 10, and arranged in parallel in the horizontal direction, i.e., in a second direction. The first and second bonding pads 16, 17 are electrically connected to a driving integrated circuit via the first the wiring 12. The second wiring 22 is disposed between the first and second bonding pads 16, 17.

The region 1 consisted of the heat-generating resistances 10, the wiring 12 and the first bonding pad 16 is a region formed by applying a thin film manufacturing process, while the region 2 consists of the second bonding pad 17 is a driving integrated circuit region.

Referring to FIG. 2, a cross-sectional view of a preferred embodiment of a conventional thermal recording device, vertically taken along the line A—A' of FIG. 1, is shown. It is noted that the parts same as those of FIG. 1 are assigned with the same reference numbers.

Referring to FIG. 2, a sectional view comprises a glaze layer 32 formed on a ceramic substrate 30 which is containing aluminum oxide ($Al_2O_3$) as the main ingredient, a heat-generating resistance film 10*a* formed on the glaze layer 32 except a part thereof, a wiring 12 formed on the heat-generating resistance film 10*a* except the predetermined portion thereof, a common wiring 14 formed on a part of the wiring 12, a protecting film 16 formed on the exposed portion of the heat-generating resistance film 10*a* and a wiring film 12 adjacently to the film 10*a*, a solder resist 18 for protecting the wiring 12 not coated with the protecting film 16, a driving integrated circuit 20 stacked on a portion of the glaze layer 32 where the heat-generating resistance film 10*a* and the wiring 12 are not formed, a wire bonding 22 (gold wire) for electrically connecting the driving integrated circuit 20 to the wiring 12, and first and second resins 24, 26 for protecting the driving integrated circuit 20 and the wire bonding 22. In the above case, the protecting film 16 is made of tantalum oxide ($Ta_2O_5$), silicon oxide ($SiO_2$) or silicon-nitride-oxide (Si-N-O).

Referring to FIG. 3, a sectional view of a vertical direction of FIG. 1, i.e., a sectional view taken along the line A—A' of FIG. 1, showing another form of the conventional device. It is noted that the parts same as those of FIGS. 1 and 2 are assigned with the same reference numbers. The difference between in FIG. 2 and FIG. 3 is that the glaze layer 32*a* of FIG. 3 formed on the substrate 30 of the same thickness as FIG. 2, is in a semicircular shape The rest of the constitution of FIG. 3 is the same as that of FIG. 2. As shown in FIG. 3, the method of forming the glaze layer 32*a* is called a "partial glaze forming method". As shown in FIG. 4, the thermal recording device which is manufactured by applying the partial glaze forming process is constituted such that the wiring 12 in the regions adjacent to 10 the exposed heat-generating resistance 54 (lying upon the partial glaze layer 52) is formed with a thinner thickness than that of the rest of the wiring.

In FIGS. 2 and 3, the thickness of the heat-generating resistance is about 0.3 μm, and that of the wiring is 0.5–2 μm. Therefore, there occur incomplete contact portions between the thermal recording paper and the heat-generating resistance due to the height difference existing at the end portion of the wiring. If the thickness of the wiring is reduced in order to overcome this contact defect, then the whole wiring resistance value is increased, and therefore, it is impossible to reduce the thickness of the wiring to below 0.5 μm.

If the thickness of the wiring is reduced, not only the overall resistance value is increased, but also the thickness of a portion of a gold wire for electrically connecting between the components has to be decreased. In order to assure the reliability for the electrical connection, at least 1 μm or more of thickness is required.

As a result, the thickness of the wiring can not be formed in less than 1 μm, and therefore, the height difference between the heat-generating resistance and the wiring becomes more than 1 μm. Thus, due to the height difference between the heat-generating resistance and the wiring, the thermal recording paper is subjected to contact defects, and these contact defects causes energy losses during the operation of the thermal recording device due to the insufficient contact between the thermal recording paper and the heat-generating resistance.

SUMMARY OF THE INVENTION

Therefore it is an object of the present invention to provide a method for manufacturing a thermal recording device in which the contact pressure produced between the thermal recording paper and the heat-generating resistance is maximized.

It is another object of the present invention to provide a method for manufacturing a thermal recording device in which the recording is made possible with a smaller amount of energy by saving the power consumption through the reduction of the energy loss caused by the contact defects between the thermal recording paper and the heat-generating resistance.

It is still another object of the present invention to provide a method for manufacturing a thermal recording device in which the contact pressure produced between the thermal recording paper and the heat-generating resistance is maximized, and at the same time, the bonding of the wires is rendered easier.

In achieving the above objects, the present invention is constituted such that the height difference between the heat-generating resistance and the adjacent wire is dualized.

According to one aspect of this invention, there is provided a method of thermal printing comprising the steps of forming a glaze layer on a ceramic substrate; forming a heat-generating resistance film on the glaze layer; forming a first wiring with a predetermined first thickness on the heat-generating resistance film; installing a JIG at a predetermined position on the first wiring; forming a second wiring having first and second thicknesses by forming a wiring of a predetermined thickness on the first wiring except the region of the jig; etching a predetermined portion of the second wiring region with the first thickness until the heat-generating resistance film is exposed.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF A PREFERRED EMBODIMENT

Figure 1:
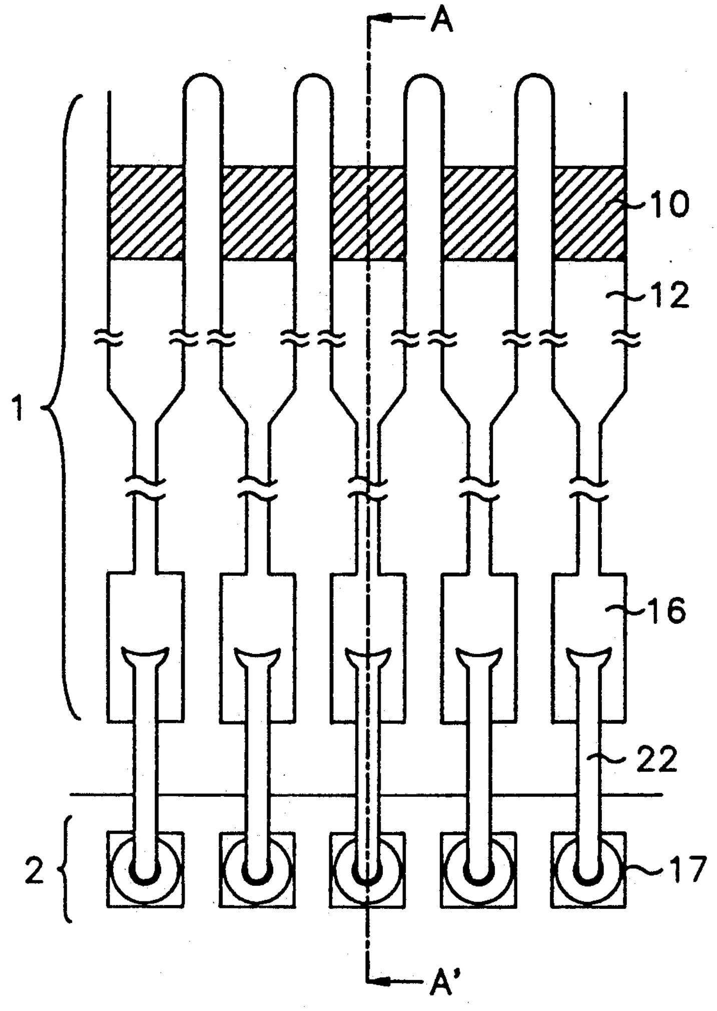
(PRIOR ART) FIG. 1
FIG. 1 shows a partial plain view of a conventional thermal recording device.
Figure 2:
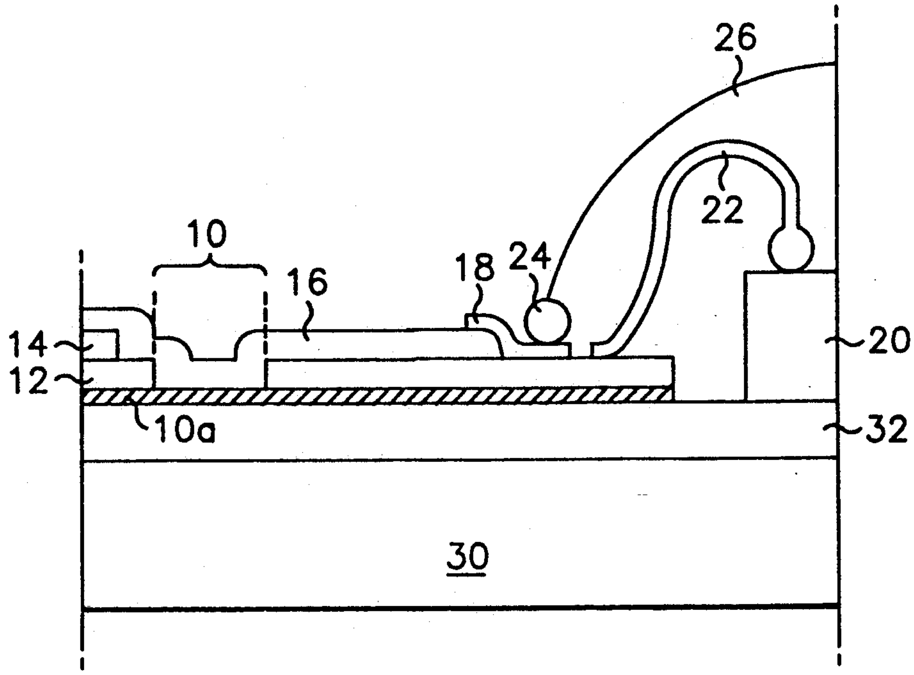
(PRIOR ART) FIG. 2
FIG. 2 shows a cross-sectional view of a conventional thermal recording device.
Figure 3:
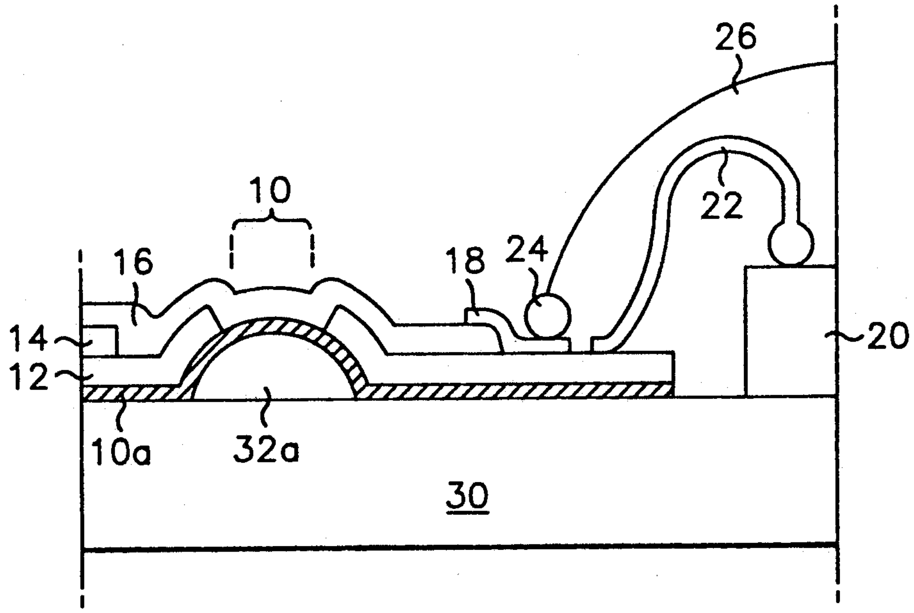
(PRIOR ART) FIG. 3
FIG. 3 shows a cross-sectional view of another conventional thermal recording device.
Figure 4:
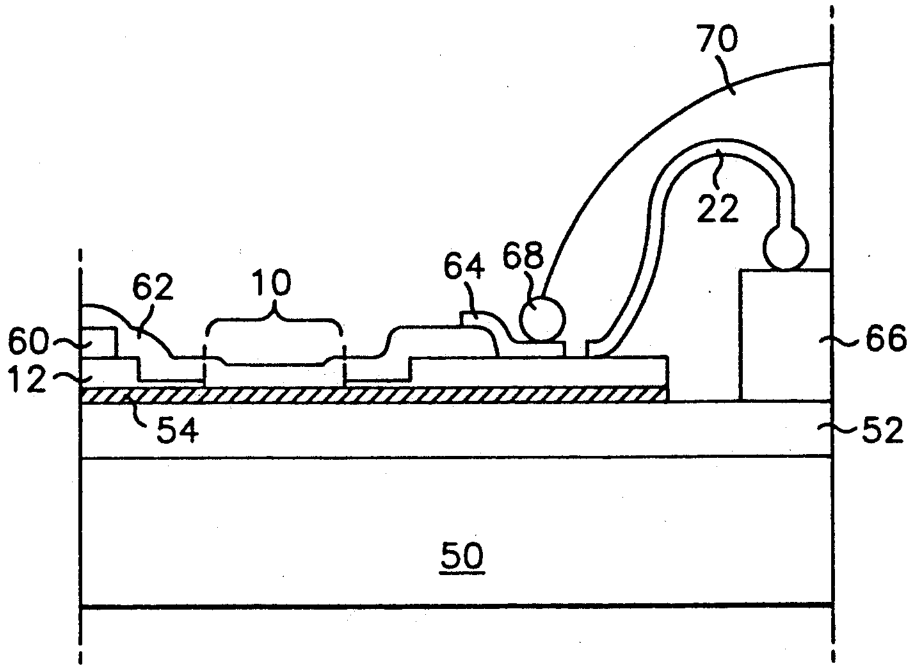
FIG. 4 shows a cross-sectional view of an embodiment of thermal recording device according to the present invention.

Referring to FIG. 4, a cross-sectional view of a preferred embodiment of a thermal recording device according to the present invention, vertically taken along the line A—A' of FIG. 1, is shown. It is noted that the parts same as those of FIG. 1 are assigned with the same reference numbers.

A preferred embodiment of this invention shown in FIG. 4 of the drawings, comprises a glaze layer 52 formed on a ceramic substrate 50 which is containing aluminum oxide ($Al_2O_3O$) as the main ingredient, a heat-generating resistance film 54 formed on the substrate 50 except a part thereof, a wiring (which is dual height) 12 formed on the heat-generating resistance film 54 except the predetermined portion thereof, a common wiring 60 formed on a part of the wiring 12 in order to applying a regular voltage into each heat-generating resistance, a protecting film 62 formed on the exposed portion of the heat-generating resistance film 54 and a wiring film 12 adjacently to the heat-generating resistance film 54, a solder resist 64 for protecting the wiring film 12 not coated with the protecting film 62, a driving integrated circuit 66 stacked on a portion of the glaze layer 52 where the heat-generating resistance film 54 and the wiring 12 are not formed, a wire bonding 22 (gold wire) for electrically connecting the driving integrated circuit 66 to the wiring 12, and first and second resins 68, 70 for protecting the driving integrated circuit 66 and the wire bonding 22.

Figure 5:
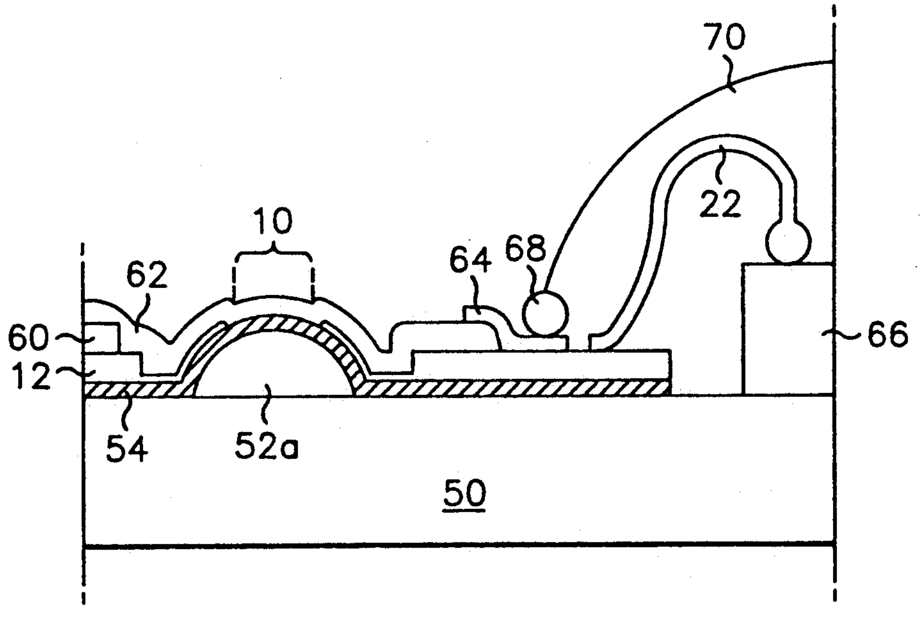
FIG. 5 shows a cross-sectional view of another embodiment of thermal recording device according to the present invention.

Referring to FIG. 5, a cross-sectional view of another preferred embodiment of a thermal recording device according to the present invention, vertically taken along the line A—A' of FIG. 1, is shown. It is noted that the parts same as those of FIG. 1 and FIG. 4 are assigned with the same reference numbers. The difference between in FIG. 4 and FIG. 5 is that the glaze layer 52 is formed on the substrate 50 of the same thickness as FIG. 4, the glaze layer 52a is formed in a semicircular shape on the substrate 50 in FIG. 5. The rest of the constitution of FIG. 5 is the same as that of FIG. 4. As shown in FIG. 5, the method of forming the glaze layer 52a is called "partial glaze forming method". As shown in FIG. 5, the thermal recording device which is manufactured by applying the partial glaze forming process is constituted such that the wiring 12 in the regions adjacent to the exposed heat-generating resistance 54 (lying upon the partial glaze layer 52a) is formed with a thinner thickness than that of the rest of the wiring, and the rest being same each other.

FIGS. 6A to 6D illustrate the manufacturing process for the thermal recording device according to the present invention, in which a jig is used in manufacturing the thermal recording device as shown FIG. 4. The starting material is a ceramic substrate 50 having a thickness of 0.8 mm and containing alumina ($Al_2O_3$) as the main ingredient.

Figure 6A:
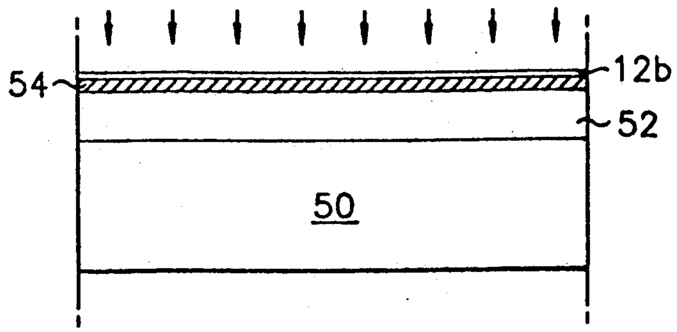
FIG. 6A-6D illustrate the manufacturing process for an embodiment of thermal recording device according to the present invention.
Figure 6B:
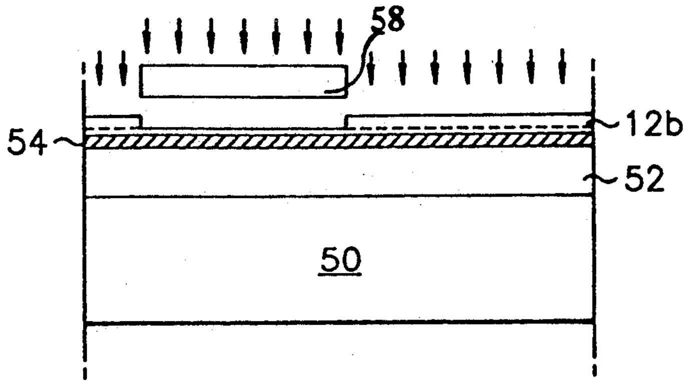
Figure 6C:
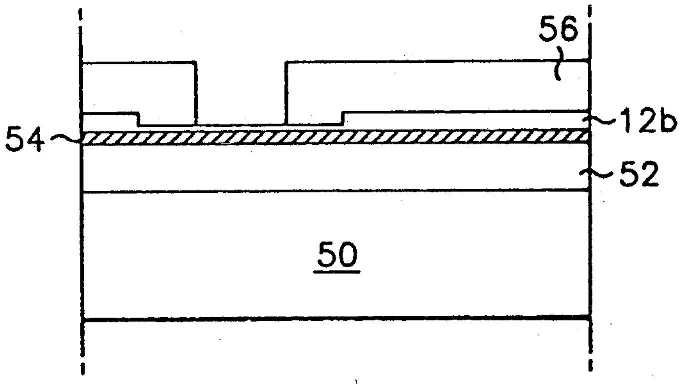
Figure 6D:
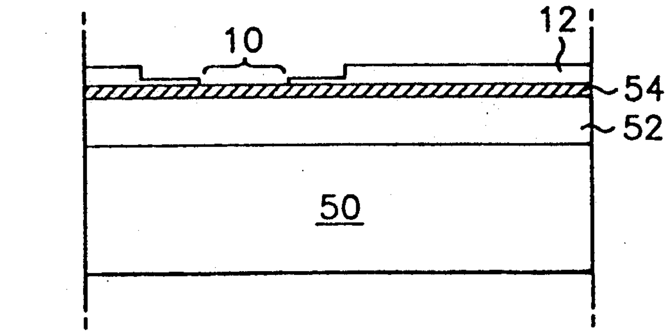

Referring to FIG. 6A, the glaze layer 52 is formed in a thickness of 40–90 μm upon the substrate 50, and then, the heat-generating resistance film 54 is formed in a thickness of about 0.3 μm upon the glaze layer 52. Then a first wiring 12a is formed in a thickness of about 0.5 μm upon the heat-generating resistance 54. Then, as shown in FIG. 6B, another wiring of about 1 μm is formed after shielding the predetermined portions with a jig 58 functioning as a mask. Thus, there is formed a second wiring 12b having a thin thickness of 0.5 μm on the predetermined regions and having a thick thickness of 1.5 μm on the other regions adjacent to the thin region. Then as shown in FIG. 6C, a mask pattern 56 is formed, to enable the heat-generating resistance to contact with a thermal recording paper. Then the second wiring 12b is etched until the heat-generating resistance film 54 is exposed, and after that, the mask pattern 56 is removed, thereby completing the wiring 12 and the heat-generating resistance 10 as shown in FIG. 6D. Then a common wiring having a thickness of about 5 μm is formed at an end of the substrate 50, and then, the protecting film is formed upon the substrate 50, thereby completing the thin film forming process. Then the product obtained from the thin film forming process, the driving integrated circuit and a printed circuit board are joined together, and then, all of them are electrically connected together by applying a wire bonding (gold wire). Then first and second resin spreading processes are performed in order to protect the driving integrated circuit and the gold wire, thereby completing the manufacturing process of the thermal recording device.

FIGS. 7A to 7D illustrate the manufacturing process for another embodiment of the thermal recording device according to the present invention using a photo-etching method in manufacturing the thermal recording device as shown FIG. 4. The starting material is same as the one which is used in the process of FIG. 6, and a glaze layer 62, a heat-generating resistance 64, a first wiring 12*c* and a first positive photosensitive resin 66 are successively formed. Here, the thickness of the heat-generating resistance 64 is about 0.3 μm, and that of the first wiring 12*c* is about 1.5 μm.

Figure 7A:
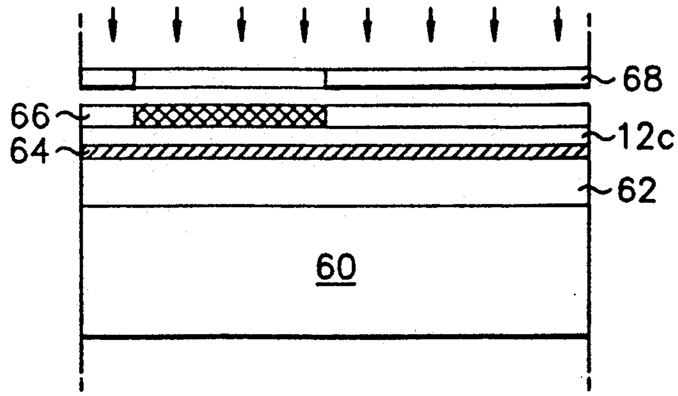
FIG. 7A-7D illustrate the manufacturing process for another embodiment of thermal recording device according to the present invention.
Figure 7B:
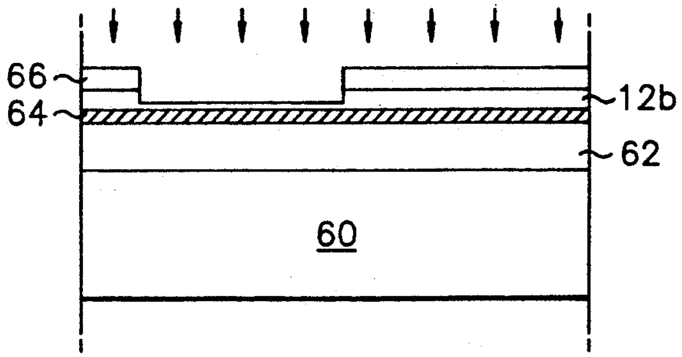
Figure 7C:
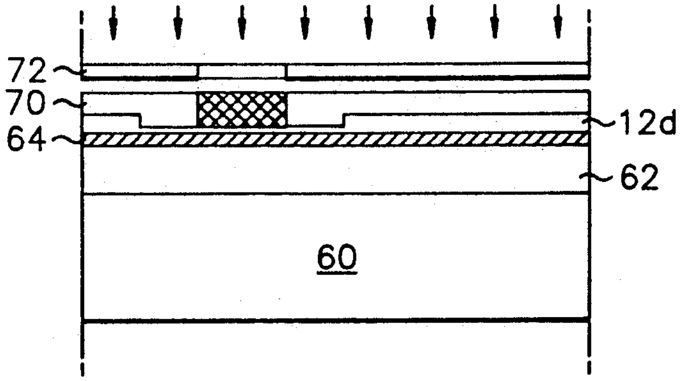
Figure 7D:
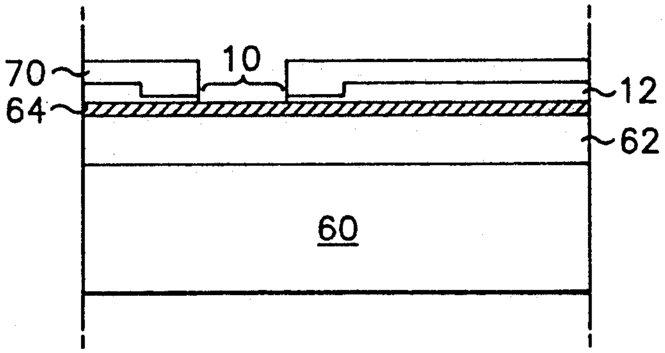

Then, as shown in FIG. 7A, a photo-etching process is performed using a first mask pattern 68 and by exposing the first positive photosensitive resin 66 for the region where a thin pattern is to be formed. In this case, the characteristics of the first positive photosensitive resin 66 that it is destroyed upon being exposed to ultraviolet rays is utilized in removing the photosensitive resin. Thus as shown in FIG. 7B, a second wiring 12*d* is formed by etching the first wiring 12*c* up to a thickness of 0.5 μm. Then as shown in FIG. 7C, a second positive photosensitive resin 70 is spread after removing the first positive photosensitive resin 66. Then a photo-etching process is performed using the second mask pattern 72 and by exposing to ultraviolet rays the second positive photosensitive resin 70 for the region where the heat-generating resistance section is to be exposed. In this case, the characteristics that the polymer of the positive photosensitive resin 70 is destroyed upon being exposed to ultraviolet rays is utilized in removing the photosensitive resin of the exposed region. Thus, as shown in FIG. 7D, the exposed second wiring 12*d* is etched, thereby completing the formation of the heat-generating resistance 10 and the wiring 12. Thereafter, the thermal recording device is completed by applying the usual processes.

Figure 8A:
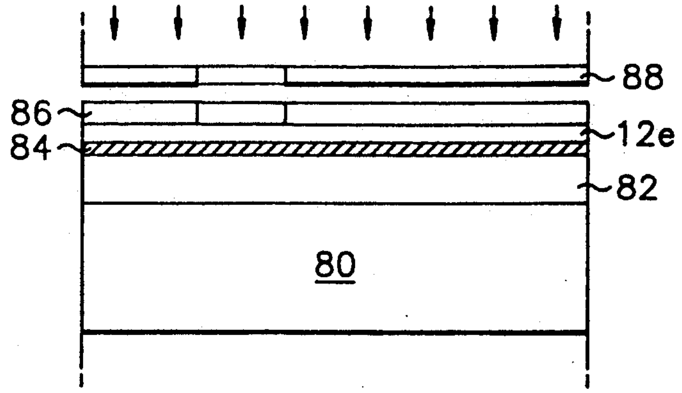
FIG. 8A-8D illustrate the manufacturing process for still another embodiment of thermal recording device according to the present invention.
Figure 8B:
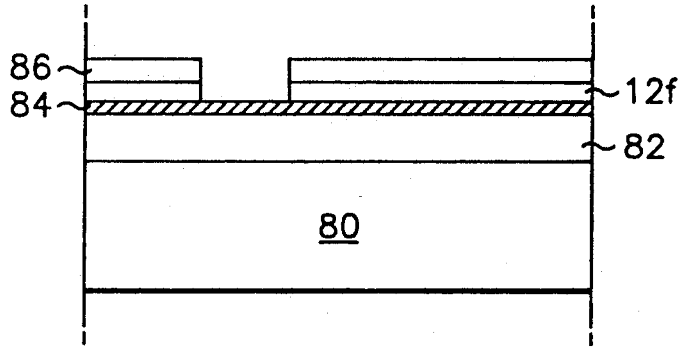

FIG. 8A to 8D illustrates the manufacturing process for still another embodiment of the thermal recording device according to the present invention, using a photo-etching method in manufacturing the thermal recording device as shown FIG. 4. and, as shown in this drawing, the device of FIG. 4 is formed by applying a dual exposing process. The starting material is same as the one which is used in the process of FIG. 6, and a glaze layer 82, a heat-generating resistance 84, a first wiring 12*e* and a positive photosensitive resin 86 are successively formed. In this case, the thickness of the heat-generating resistance 84 is about 0.3 μm, and that of the first wiring 12*e* is about 1.5 μm. Then as shown in FIG. 8A, a photo-etching process is performed using a first mask pattern 88 and by exposing to ultraviolet rays the positive photosensitive resin 86 for the region where the heat-generating resistance section is to be formed. Thus as shown in FIG. 8B, after removing the positive photosensitive resin 86 for the exposed region, the exposed first wiring 12*e* is etched, thereby forming the heat-generating resistance 10 and a second wiring 12*f*.

Figure 8C:
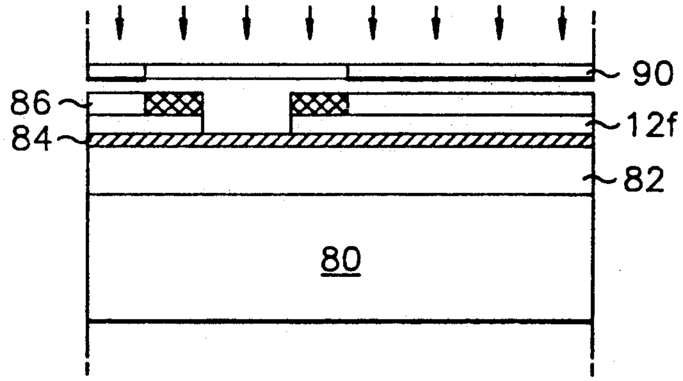
Figure 8D:
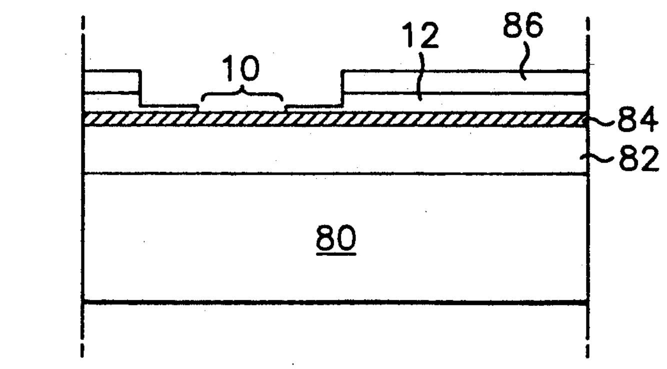

Then as shown in FIG. 8C, with the positive photosensitive resin 86 being left intact, a photo-etching is performed using a second mask pattern 90 and by exposing to ultraviolet rays the positive photosensitive resin 86 for the region where a thin wiring is to be formed. Thus as shown in FIG. 8D, after removing the positive photosensitive resin 86 of the exposed region, the second wiring 12*f* of the exposed region is etched by about 1 μm, thereby forming the wiring 12. In this case, the thickness of the wiring adjacent to the heat-generating resistance 10 is about 0.5 μm, and thereafter, the thermal recording device is completed by applying the usual processes.

The above descriptions are based on the case that the glaze layer is formed on the whole surface of the substrate as shown in FIG. 4, but, according to another embodiment of the present invention, the same process can be applied to the case where the thermal recording device is formed by applying the partial glaze process as applied in FIG. 5. One skilled in the art will easily recognize that the above particular process or method may be used without departing from the scope and spirit of the invention.

Further, the above descriptions are based on the assumption that a positive photosensitive resin is used in the process of FIG. 7, but, according to another embodiment of the present invention, a negative photosensitive resin can be used in the case where a reverse image mask pattern is used.

According to the present invention as described above, a process for minimizing the thickness of the wiring adjacent to the heat-generating resistance is additionally provided, so that it should be possible to dualize the height difference between the heat-generating resistance and the wiring, thereby maximizing the contact pressure between the heat-generating resistances and the thermal recording paper. This brings the result that a high quality printing can be performed with a smaller amount of energy compared with the case of the conventional thermal recording device. Further, the energy loss caused by the defective contacts between the heat-generating resistance and the thermal recording paper can be reduced, resulting in that a low energy consumption type thermal recording device can be formed. Further, the thickness of the wiring adjacent to the heat-generating resistance is formed in a thickness of about 0.5 μm, and the rest of the region is formed in a thickness of about 1 μm, so that the contact pressure between the thermal recording paper and the heat-generating resistance should be maximized, and that the wire bonding between the elements can be carried out in an easy manner.

What is claimed is:

1. A method for manufacturing a thermal recording device, comprising the steps of:

forming a glaze layer on a semiconductor substrate;

forming a heat-generating resistance film on said glaze layer;

forming a first wiring layer of a first thickness on said heat-generating resistance film;

forming a second wiring layer of a second thickness on said first wiring layer of the first thickness except of a predetermined area of said first wiring layer; and etching a selected portion of said predetermined area of said first wiring layer of the first thickness until said heat-generating resistance film is exposed.

2. The method for manufacturing a thermal recording device as claimed in claim 1, wherein said first thickness is about 0.5 μm, and second thickness is about 1.5 μm.

3. The method for manufacturing a thermal recording device as claimed in claim 1, wherein said glaze layer is partially formed on selected portions of said semiconductor substrate.

4. A method for manufacturing a thermal recording device, comprising the steps of:

forming a glaze layer on a semiconductor substrate;

forming a heat-generating resistance film on said glaze layer;

forming a wiring layer of a first thickness on said heat-generating resistance film;

forming a first photosensitive film on said first wiring layer of the first thickness;

removing a predetermined portion of the first photosensitive film to form a first exposed portion of the first wiring layer, forming an etched wiring layer by etching the exposed portion of said first wiring layer down to a second thickness, and removing said first photosensitive film;

forming a second photosensitive film on the etched wiring layer;

forming a second exposed portion of the first wiring layer by removing a predetermined portion of the second photosensitive film to expose a second portion of the wiring layer where said first wiring layer has been previously etched to the second thickness, said second exposed portion of the first wiring layer having a smaller area than the exposed first portion of the first wiring layer; and etching the second exposed portion of the wiring layer until the heat-generating layer is exposed.

5. The method for manufacturing a thermal recording device as claimed in claim 4, wherein said first thickness is about 1.5 μm, and said second thickness is about 0.5 μm.

6. The method for manufacturing a thermal recording device as claimed in claim 4, wherein said glaze layer is formed on predetermined portions of said semiconductor substrate.

7. A method for manufacturing the thermal recording device, comprising the steps of:

forming a glaze layer on a semiconductor substrate;

forming a heat-generating resistance film on said glaze layer;

forming a wiring layer having a first thickness on said heat-generating resistance film;

forming a first photosensitive film on said wiring layer;

removing a first selected portion of the first photosensitive film and the wiring layer until the heat-generating resistance film within said first selected portion is exposed using a first mask pattern; and removing a second selected portion of the first photosensitive film and the wiring layer until the wiring layer is transformed into a second thickness by a second mask pattern, with said first selected portion being within said second selected portion, and said second thickness of the wiring layer being thinner than said first thickness.

8. The method for manufacturing a thermal recording device as claimed in claim 7, wherein said first photosensitive film is a positive photosensitive film.

9. The method for manufacturing a thermal recording device as claimed in claim 7, wherein said first thickness is about 1.5 μm, and said second thickness is about 0.5 μm.

10. The method for manufacturing a thermal recording device as claimed in claim 7, wherein said glaze layer is formed on predetermined portions of said semiconductor substrate.

11. The method for manufacturing a thermal recording device as claimed in claim 1, wherein said heat-generating resistance film has a thickness of 0.3 μm, and said glaze layer has a thickness of approximately 40–90 μm.

12. The method for manufacturing a thermal recording device as claimed in claim 4, wherein said heat-generating resistance film has a thickness of 0.3 μm, and said glaze layer has a thickness of approximately 40–90 μm.

13. The method for manufacturing a thermal recording device as claimed in claim 7, wherein said heat-generating resistance film has a thickness of 0.3 μm, and said glaze layer has a thickness of approximately 40–90 μm.

14. The method for manufacturing a thermal recording device, comprising the steps of:

forming a glaze layer on a semiconductor substrate;

forming a heat-generating resistance film on the glaze layer;

forming a wiring layer having a first thickness on the heat-generating resistance layer;

reducing a thickness of the wiring layer within a first selected portion of the wiring layer until the wiring layer within said first selected portion reaches a second thickness; and removing a second selected portion within the first selected portion of the wiring layer having the second thickness until the heat-generating resistance layer within the second selected portion is exposed.

15. The method for manufacturing a thermal recording device as claimed in claim 14, further comprised of making said heat-generating resistance layer with a thickness of 0.3 μm, and said glaze layer with a thickness of approximately from 40–90 μm.

16. The method for manufacturing a thermal recording device as claimed in claim 15, further comprised of making said first thickness of the wiring layer with a thickness of about 1.5 μm, and said second thickness of the wiring layer with a thickness of about 0.5 μm.

17. The method for manufacturing a thermal recording device as claimed in claim 15, further comprised of making said semiconductor substrate with a thickness of 0.8 mm and with alumina as a main constituent.

18. The method for manufacturing a thermal recording device as claimed in claim 14, further comprising the step of forming a protective film from one of a tantalum oxide, a silicon oxide and a silicon-nitride-oxide compound, upon the semiconductor substrate, with said protecting film covering the wiring layer and the heat-generating resistance layer.

* * * * *

UNITED STATES PATENT AND TRADEMARK OFFICE
CERTIFICATE OF CORRECTION

PATENT NO. : 5,252,182

DATED : October 12, 1993

INVENTOR(S) : Eun-Tak Hong

It is certified that error appears in the above-identified patent and that said Letters Patent is hereby corrected as shown below:

IN THE ABSTRACT

Line 4, after "masking process" insert --, a photo-etching process,--;

Column 1,

Line 11, replace "in formation" with --information--;

Column 3

Line 57, change "(Al 2O 3O) " to --($Al_2O_3$)--;

Line 63, replace "applying" with --apply--;

Column 4,

Line 33, replace "(Al 2O 3)" with --($Al_2O_3$)--;

UNITED STATES PATENT AND TRADEMARK OFFICE

CERTIFICATE OF CORRECTION

PATENT NO. : 5,252,182

DATED : October 12, 1993

INVENTOR(S) : Eun-Tak Hong

It is certified that error appears in the above-identified patent and that said Letters Patent is hereby corrected as shown below:

IN THE CLAIMS

Column 6,

Line 57, before "second thickness" insert --said--;

Line 23, replace "film" with --layer--;

Signed and Sealed this

Sixteenth Day of August, 1994

Attest:

Bruce Lehman

BRUCE LEHMAN

*Attesting Officer* *Commissioner of Patents and Trademarks*